US009495625B2

(12) United States Patent
Launay et al.

(10) Patent No.: US 9,495,625 B2
(45) Date of Patent: Nov. 15, 2016

(54) METHOD AND DEVICE FOR PERSONALIZING AT LEAST TWO CARDS, AND CARD OBTAINED VIA SAID METHOD

(71) Applicant: OBERTHUR TECHNOLOGIES, Colombes (FR)

(72) Inventors: Francois Launay, Colombes (FR); Gregory Simonneaux, Colombes (FR); Franck Geffray, Colombes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 0 days.

(21) Appl. No.: 14/345,724

(22) PCT Filed: Sep. 20, 2012

(86) PCT No.: PCT/FR2012/052094
§ 371 (c)(1),
(2) Date: Mar. 19, 2014

(87) PCT Pub. No.: WO2013/041808
PCT Pub. Date: Mar. 28, 2013

(65) Prior Publication Data
US 2014/0224880 A1    Aug. 14, 2014

(30) Foreign Application Priority Data
Sep. 20, 2011  (FR) ...................................... 11 58325

(51) Int. Cl.
*G06K 19/00* (2006.01)
*B41M 3/00* (2006.01)
(Continued)

(52) U.S. Cl.
CPC ............. *G06K 19/00* (2013.01); *B41F 15/089* (2013.01); *B41F 15/0881* (2013.01);
(Continued)

(58) Field of Classification Search
CPC ................... B42D 15/04; B42D 25/00; G06Q 20/355
(Continued)

(56) References Cited

U.S. PATENT DOCUMENTS 6,159,570 A * 12/2000 Ulrich et al. ................. 428/40.1
6,923,378 B2 * 8/2005 Jones et al. .................... 235/488
8,439,269 B2 * 5/2013 Nettesheim et al. ......... 235/488

FOREIGN PATENT DOCUMENTS

| FR | 2 281 221 | 3/1976 |
| FR | 2 651 179 | 3/1991 |
| FR | 2 814 113 | 3/2002 |

OTHER PUBLICATIONS

International Search Report dated Dec. 18, 2012, corresponding to PCT/FR2012/052094.

* cited by examiner

*Primary Examiner* — Daniel St Cyr
(74) *Attorney, Agent, or Firm* — Young & Thompson

(57) ABSTRACT

A method of personalization for at least two cards (10), each card including a first side, a second side, and a peripheral surface, includes the following steps: forming a pile (20) of at least two cards by stacking the first side or the second side of an article (n) such that the first surface or the second surface of the following card (n+1) is in contact with the first side or the second side of the card (n); aligning, via an alignment device (32, 34) at least one element of the peripheral surface of the card (n) with at least one element of the peripheral surface of the following card (n+1) such that at least one element of the set of peripheral surfaces of each card forms at least one uniform surface; applying, via an application device, at least one product on at least one element of the uniform surface.

23 Claims, 3 Drawing Sheets

(51) Int. Cl.
*B41F 15/08* (2006.01)
*B41F 17/24* (2006.01)
*B41F 17/28* (2006.01)
*B41F 17/30* (2006.01)
*G06K 19/02* (2006.01)
*B42D 25/405* (2014.01)
*B42D 25/00* (2014.01)

(52) U.S. Cl.
CPC ............ *B41F 15/0895* (2013.01); *B41F 17/24* (2013.01); *B41F 17/28* (2013.01); *B41F 17/30* (2013.01); *B41M 3/00* (2013.01); *B42D 25/00* (2014.10); *B42D 25/405* (2014.10); *G06K 19/022* (2013.01); *B42D 2035/24* (2013.01)

(58) Field of Classification Search
USPC ........................................ 235/487, 383, 385
See application file for complete search history.

METHOD AND DEVICE FOR PERSONALIZING AT LEAST TWO CARDS, AND CARD OBTAINED VIA SAID METHOD

BACKGROUND OF THE INVENTION

The present invention relates to a method for personalizing at least one card and more specifically the edge face of these cards, and to the cards obtained by such a method.

A card may be understood to mean a chip card, which may be of the contactless type, or other items which exhibit features similar to those described hereinafter. It may also be understood to mean a chipless card, such as a loyalty card, preferably made of a plastics material. The personalization may also be applied to items such as CD-ROMS or DVD-ROMS, which have similar features, notably in terms of their thickness.

They may be identification cards, such as, for example, bank cards and/or identity cards and/or transport cards and/or loyalty cards.

A card is defined by two opposite faces parallel in pairs, which will be referred to as the first face and the second face, and by a peripheral surface which surrounds the first face and the second face. This peripheral surface may also be referred to as the edge face or the edge of the card.

A card may be formed of a single material or of a plurality of materials, generally laminations, of various thicknesses. These laminations are sandwiched and assembled together to form a unit assembly. The cards may be of different thicknesses and include, for example, cards referred to as mini SD cards, with a thickness of roughly 1.4 mm, USD cards, with a thickness of around 1 mm, or even ID1-format cards with a thickness of the order of 0.76 millimeter as defined in standard IS07816.

To personalize cards, various methods that allow all or part of the first face and/or of the second face to be marked are known. Notably, it is known practice to print patterns, for example using screen printing. Such printing may allow the cards to be differentiated from one another by applying different colorways and/or patterns.

By contrast, the edge faces of these cards are generally white, and this may make them tricky to differentiate when stacked, for example in a wallet or a card holder.

There are, however, cards the edge faces of which are personalized individually, notably using a laser marking technique in which an alphanumeric code and/or marks are applied in the form of "bars", for example. Such a method requires the cards to be personalized one after another, and represents a significant amount of time and technical investment.

The use of cards formed of one or more laminations and in which each lamination may be mass-colored is also known. Such an embodiment therefore makes it possible to obtain cards the edge faces of which are colored and can therefore allow the cards to be differentiated from one another with ease.

However, colored laminations are more expensive than the white laminations traditionally used and such a method requires a significant stock of laminations of various thicknesses and various colors to be held in order to meet the needs of the customer and the requirements of assembling the card. Such a stock may represent a not-insignificant volume and cost. This stock may also carry a significant risk of obsolescence.

SUMMARY OF THE INVENTION

The present invention seeks to propose a solution that allows at least one set of cards to be personalized easily while at the same time being technically simple to carry out and low in cost.

The invention relates to a method of personalizing at least two cards, each card comprising a first face and a second face and a peripheral surface, characterized in that the method comprises the following steps:

forming a pile of at least two cards by superposing the first face or the second face of a card "n" in such a way that the first face or the second face of a card "n+1" is in contact with the first face or the second face of the card "n";

aligning at least part of the peripheral surface of the card "n" with at least part of the peripheral surface of the card "n+1" using an alignment device so that at least part of the set of peripheral surfaces of each card forms at least one uniform surface;

applying at least one product to at least part of the uniform surface using an application device.

Such a method may notably allow the edge face of a set of cards to be personalized quickly while at the same time limiting the costs more particularly associated with the use of mass-colored materials.

A uniform surface is to be understood as meaning that the aligned peripheral surfaces may form a substantially flat surface.

"n", "n+1" mean that the cards may follow one another. Thus, a card "n" may also be preceded by another card that would be referred to as "n−1", or preceding card. This same card "n" may be followed by another card referred to as "n+1" or following card. If a pile of cards is to be formed, then the first card may be referred to as "n", the next will be referred to as "n+1", the one after that "n+2" and so on.

The expression "by superposing" may be replaced by the expression "by piling or stacking".

The product may also be applied to the entirety of the uniform surface.

The product applied may for example be a colored substance such as an ink, a film or a colored adhesive.

In particular, the ink used may be a UV-curable ink (dried by ultraviolet radiation) which has better mechanical resistance characteristics than solvent-based inks.

According to another embodiment, the ink may be resin-based, also referred to as plastisol, which notably affords sufficient mechanical resistance for the life of a card. By way of example, the life of a bank card is of the order of two to three years.

Quite clearly it is possible to conceive of applying a plurality of inks, making it possible for example to obtain a multicolored edge face.

It is for example conceivable to apply the method described to personalize French identity documents. An identity card may therefore have an edge face made up of three bands substantially perpendicular to the first and second faces. The three bands may, for example, be in the following colors: blue, white and red.

It is also conceivable to spray an adhesive product and then to apply to it, for example flakes or any other element in the form of particles.

It may also be conceivable to apply an infrared ink which may, for example, make it possible to create a device that cannot be falsified.

This method may be applied to at least two cards, advantageously at least 250 cards, and more advantageously still, 500 cards.

It is also conceivable to apply this method to a pile of several CD-ROMS.

Depending on the number of cards and the thickness thereof, it is conceivable for the height of the pile to be at least 0.70 millimeter and in particular from 0.70 millimeter to 2 meters. Advantageously, the height of the pile may vary from 10 centimeters to 7 centimeters and more particularly may have a height of roughly 30 centimeters.

Advantageously, the application device may be a spraying device and more particularly a paint spraying device.

A spraying device may notably make it possible to obtain better distribution of product over the edge face of the items. This is because in the case of an item made up of a plurality of laminations, as is the case with certain chip cards for example, the edges are not always uniform. Applying a product using a roller for example may then give rise to problems of uniformity and distribution of the substance.

More specifically, the spraying device may be of the directional spraying type, such as an inkjet for example.

Inkjet spraying is spraying using at least one nozzle that allows very small droplets of ink to be sprayed.

It is notably possible to use the "drop on demand" system more usually known by its English-language abbreviation "DOD".

The application device may also be a transfer printing device and more particularly a thermal transfer printing device. This device works via a film or ribbon which bears a material that is to be applied. For preference, the material may be a colored adhesive or even a coated band. The coated band may be a colored band.

The ribbon is applied to the surface that is to be covered then the ribbon is heated, generally via a thermal head. This step activates the transfer of the material carried by the band onto the surface that is to be covered.

The heating temperature may extend from 50° C. to 400° C. and preferably from 150° C. to 250° C.

In this particular instance, it may be appropriate to make good any irregularities caused by the cutting of the cards and/or by problems of aligning the various laminations of which each card is made up. To do this, the thermal head, which usually has a rigid surface, is replaced by a head that is malleable, and therefore flexible. It is possible for example to use a head made from a material based at least in part on silicone.

The thermal head is configured to withstand at least the heating temperature mentioned hereinabove.

Once the ink has been transferred it is possible to remove some of the ink applied to the card, for example using a laser. Such ablation may for example make it possible to create various patterns on the edge face of each card.

In particular, the method may involve a step consisting in
  positioning a mask opposite at least part of a uniform surface in such a way that the product is applied only to part of this uniform surface.

Such a step may notably make it possible to create a particular pattern on the edge face, or peripheral surface, of each card. The mask may therefore be used as a stencil.

The pattern may be a series of symmetric or asymmetric repeating patterns.

It is also conceivable to create a particular pattern that can be recreated by reconstituting the pile of cards. This example may notably be used for the purposes of inspiring loyalty from a customer base and/or in the context of building up a collection, for example by personalizing the edge faces of telephone cards.

It is also conceivable to use a particular pattern as a check. All that is then needed is for the personalized card to be repositioned opposite the mask to ensure that the card has not come from a parallel economy. This example may, for example, be used in the manufacture of passports.

The method may also comprise a step consisting in:
  pressing the ends of the pile towards one another using a pressing device by applying pressure P to at least part of the visible faces of the cards which form the ends of the pile.

Such a step may notably make it possible to hold the cards of the pile together. It may notably be beneficial to keep these cards together if there is a desire to transport the pile of cards, which have been formed and aligned, from one point to another.

Such a step may also make it possible to prevent the product from infiltrating between the cards and may thus limit the risks of burrs on the first face or the second face of the cards.

A person skilled in the art will be able to adapt the pressure applied to the cards of the pile notably to suit the roughness of the materials used to form the first and second face. The person skilled in the art will also be able to adapt the pressure applied according to the viscosity of the product used.

The pressing device may be an instrument in the form of jaws, such as a vice. The pressing device may apply pressure for example via a screw or an elastic means. The elastic means may be a spring. In particular, the pressing device may be connected to a measurement means, such as a dynamometer, allowing the pressure applied to be adjusted and/or reproduced.

Furthermore, the method may comprise a step consisting in:
  removing the alignment device in such a way that the product can be applied to the surface used for aligning the pile.

Furthermore, the method may comprise a step consisting in:
  pre-drying, using a pre-drying device, the product applied to the uniform surface in such a way that the product does not run between the faces of the cards.

This step may ideally be carried out ahead of a step consisting in:
  separating the cards, using a separation device so that the product does not stick the items together.

The method may also comprise a step consisting in:
  drying, using a drying device, the product applied to the uniform surface.

Such a step may notably make it possible to limit the running of product over the faces of the cards.

The drying and/or pre-drying device may for example be a device that dries using infrared, hot air, or any other known device.

Advantageously, the separation device is a device able to generate enough vibration to separate the cards after the drying and/or pre-drying step.

The device may generate vibration in the pile of cards so that the dried or pre-dried cards are separated from one another. This is because the product applied to the edge faces may fuse the cards together.

The method may notably comprise a step consisting in reducing the irregularities of the peripheral surface.

This is because each card may be cut at a certain angle. Thus, even if the cards are aligned with one another, the peripheral surface may be formed of a multitude of protruding elements that will be referred to as peaks.

These peaks may generate unevennesses when the product is applied.

The idea is to reduce the peaks by adding to the method the step mentioned hereinabove thereby obtaining a uniform surface. This step may notably be carried out by a head which presses against the surface for application.

According to one first embodiment, the head may comprise a flat surface which comes into contact with the surface.

According to a second embodiment, the head may be a circular head which passes at least in part over the surface to which at least one product is to be applied.

As an alternative, it is conceivable for the head to be stationary and for it to be the pile of cards that comes into contact with the head.

The head may comprise an abrasion device which acts by vibration or rotation, and which thus reduces the peaks when these are in contact with the head.

According to another embodiment, the head may comprise a heating device configured to melt the peaks.

It is conceivable for the head to be the same one as is used for applying the product to at least part of the set of peripheral surfaces formed by the set of cards.

The method may then comprise a step for reducing the peaks using a heating head and a later step for applying a product.

The invention also relates to a card which may comprise an edge face that is personalized using the device described hereinabove. Such a card may notably comprise part of the edge face which is coated with at least one product. In particular, the product may be an ink, a film or a colored adhesive.

In particular, the card may be a card with or without a chip or microprocessor. The dimensions of the card may for example be roughly 85 millimeters×54 millimeters×0.76 millimeters. Other dimensions are of course also conceivable and it is notably conceivable to vary the thickness from 0.5 millimeter to 4 millimeters and in particular from 0.7 millimeter to 1.2 millimeters.

It may also be conceivable to use this method for personalizing the edge face of at least one CD-ROM.

The materials used for the card may for example be polymer materials or even fibrous materials. A person skilled in the art will adapt the product that is to be applied to suit the material used for the manufacture of the card.

The invention also relates to a device for personalizing at least one card, said card may comprise a first face, a second face and a peripheral surface.

The device may notably comprise at least a means for carrying out, at least in part, one of the steps described hereinabove. In this particular instance, the device may comprise at least one of the following elements:
- a means for forming a pile of cards,
- a means for at least partially aligning the cards,
- a means for applying a product to at least part of the pile of cards,
- a means for positioning a mask opposite at least part of the pile of cards,
- a means for pressing the ends of the pile of cards towards one another,
- a means for pre-drying the product applied to at least part of the pile of cards,
- a means for separating the items of the pile of cards, and
- a means for drying the product applied.

BRIEF DESCRIPTION OF THE DRAWINGS

Other features and advantages of the invention will become apparent in the light of the description which follows, given with reference to the nonlimiting attached drawings in which.

DESCRIPTION OF PREFERRED EMBODIMENTS

Figure 1:
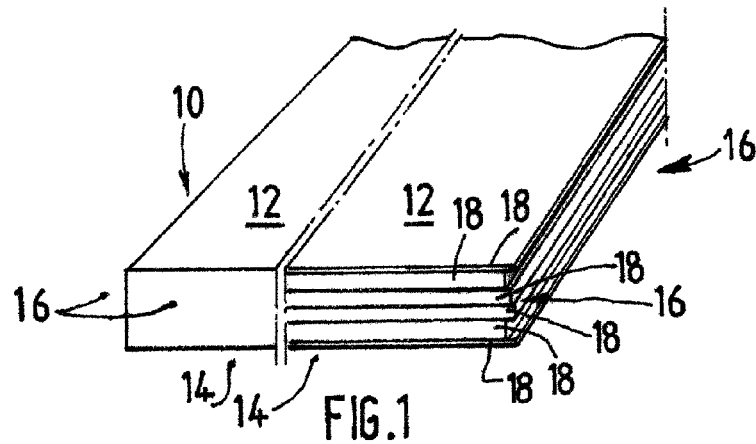
FIG. 1 is a schematic depiction of a card that is to be personalized using the method of the invention.

FIG. 1 depicts a card 10 which may be a chip card. This card 10 comprises a first face 12, a second face 14 and a peripheral surface 16.

As indicated in the right-hand part of FIG. 1, this peripheral surface 16 may have irregularities, notably caused by the superposition of the various sandwiched laminations 18.

By contrast, as has been depicted in the left-hand part of FIG. 1, the peripheral surface 16 may have a substantially flat surface, notably when the item 10 is made in a single material. This surface may, however, have a number of irregularities caused by the cutting tool.

Figure 2:
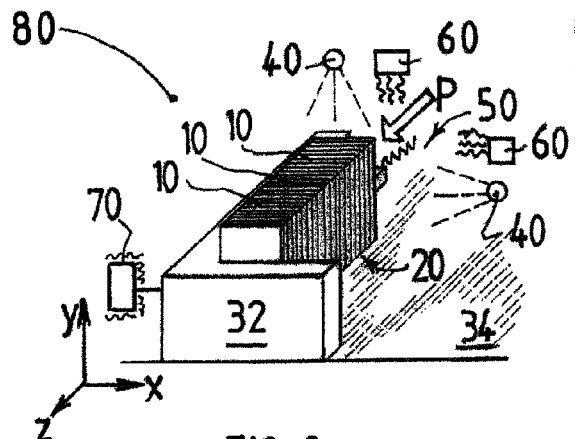
FIG. 2 is a schematic perspective depiction of the personalizing device according to the invention.
Figure 2A:
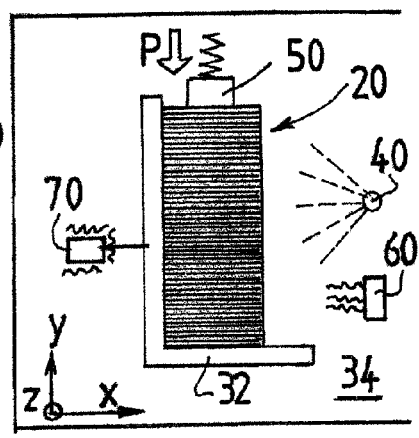
FIG. 2a is a plan view of the device of FIG. 2.

FIGS. 2 and 2a depict the personalizing device 80 according to the invention, in which a set of cards 10 has been superposed in such a way that the set of cards 10 forms a pile 20. The cards 10 of the pile 20 have been aligned by an alignment device so that the peripheral surfaces 16 of each card form a substantially uniform surface.

In the example depicted, the alignment device comprises a substantially flat element 34 and an L-shaped element 32 the two branches of which are in contact with the flat element 34. It is conceivable for the L-shaped element 32 to come, through a translational movement with the flat element 34, into contact with the pile 20. Thus, the peripheral surfaces of the cards 10 are pushed in such a way that the set of cards forms a pile 20 the exterior surfaces of which are substantially flat.

The personalizing device 80 also comprises a pressing device 50 intended to press the pile 20 of cards 10 towards one of the branches of the L of the element 32. The cards 10 of the pile 20 are thus held in position and the pile 20 can thus be easily moved around and/or have various methods applied to it.

As depicted in FIGS. 2 and 2a, the personalizing device 80 may comprise a plurality of product application devices 40, such as paint spraying devices. These spraying devices may notably make it possible to obtain a uniform distribution of product, such as paint, over the substantially uniform surface of the pile 20 of cards 10.

The personalizing device 80 may also comprise a plurality of drying devices 60 and/or pre-drying devices 60' which are intended to dry and/or to pre-dry the paint, or any other product, applied to the edge faces of the cards 10 of the pile 20. In the example depicted, the drying devices 60 and pre-drying devices 60' are identical but it is conceivable for them to correspond to different forms of equipment. The drying devices 60 and/or pre-drying devices 60' depicted are, for example, infrared drying devices. A person skilled in the art will quite obviously be able to use other devices such as, for example, a drying tunnel and/or an air blowing device, more particularly a hot-air-blowing device.

The person skilled in the art will adapt the number of application devices 40, drying devices 60 and/or pre-drying devices 60' according to the number of cards 10 in the pile 20 so that each card 10 undergoes the same treatment.

The personalizing device 80 depicted comprises a separation device 70. This separation device 70 makes it possible to generate vibrations which encourage the cards 10 which may have fused together through the nature of the product used, to separate. As depicted, the separation device 70 is applied in the region of the L-shaped element 32 but it is conceivable for the vibrations to be applied to the flat element 34, the pressing device 50 and/or directly to the pile 20.

It will be understood that, in order to achieve optimum separation of the cards using vibration, the pressure P applied by the pressing device 50 to the ends of the pile 20 of cards 10 has to be released.

In particular, the vibration separation device may be embodied by an eccentric device (not depicted) connected to a drive device such as an electric motor (not depicted).

The device depicted in FIGS. 2 and 2a may notably allow two of the four flat surfaces of the pile 20 which surfaces are formed by the edge faces of the cards 10 to be personalized. If all of the edge faces of the cards 10 are to be personalized, then all that is required is for the pile 20 of cards 10 to be repositioned so that the edge faces not personalized become visible and for the operation of holding and personalizing the cards to be repeated.

Figure 3:
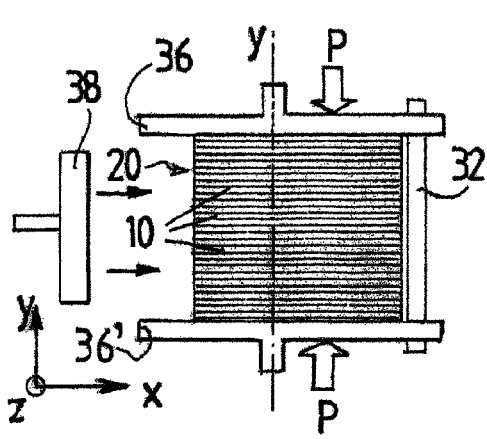
FIG. 3 is one particular embodiment, in front elevation, of a device for holding a pile of cards according to the invention, FIG. 3a corresponds to the plan view of FIG. 3, FIGS. 4a to 4h depict front elevations of the various steps of a method according to the invention, and the primed figures depict the corresponding plan views.
Figure 3A:
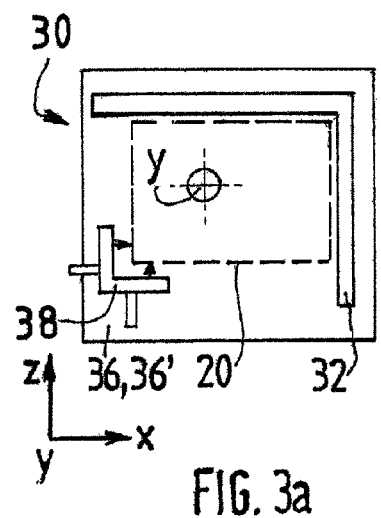

FIGS. 3 and 3a depict one particular example of a holding device as may be used by the method according to the invention.

This holding device may comprise two plates 36 and 36' intended to sandwich a plurality of cards 10 between them in order to form a pile 20.

The edges of the pile 20 are then aligned by a holding means which comprises an L-shaped element 32. This L-shaped element 32 can be held between the plates 36 and 36' by a removable device (not depicted). The removable device may, for example, be a screw-nut system or even a system of retractable balls which collaborate with corresponding orifices.

The L-shaped element may be formed of two separate plates 32' which, once assembled, form an L. It may also be conceivable for the plates 32' that form the L to slide in grooves 31 provided for that purpose in the plates 36 and 36' (which are depicted in FIGS. 4b to 4d).

The L-shaped element 32 (FIGS. 3 and 3a) and/or the plates 32' (FIGS. 4b to 4d) form end stops intended to keep the pile 20 aligned. The person skilled in the art will quite obviously be able to adapt the shapes of these end stops. In particular, the end stops may take the form of rods, for example threaded rods, passing through the plates 36 and 36'.

It is also conceivable for the plates 32' to be masks representing a particular pattern. It may then be conceivable to leave these masks when applying the product so as to reproduce the pattern represented by the masks. The masks then act as stencils.

Once the cards 10 have been placed between the plates 36, 36' and the L-shaped element 32 has been brought into position, a tamping device 38 tamps the cards 10 against the element 32 to form a pile 20 the edge of which is substantially flat.

Once the pile 20 is formed, pressure P can be applied to the plates 36 and 36' along the axis Y so that the pile 20 remains formed. The L-shaped element 32 and the tamping device 38 can then be removed to make all of the edges of the pile 20 accessible. A product can then be applied to all of the edges of the pile 20.

According to one particular embodiment, the pile 20 may be set in rotation about an axis Y, passing through the first and second faces of the cards 10. It is then possible to spray a product onto all of the edge faces of the cards 10 that form the pile 20.

Various steps for carrying out the method according to the invention will now be described.

Figure 4A:
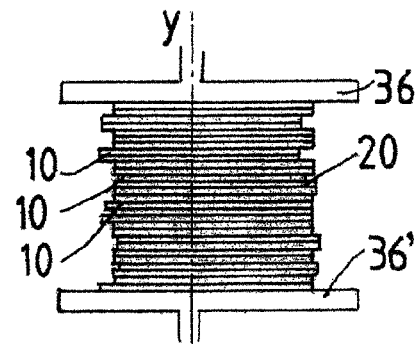
Figure 4A:
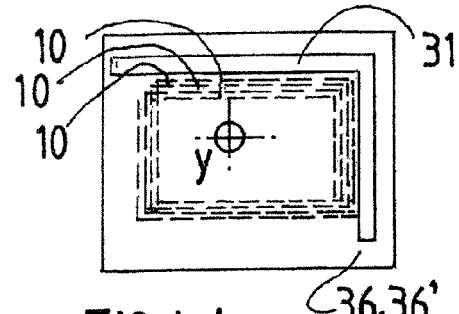
Figure 4B:
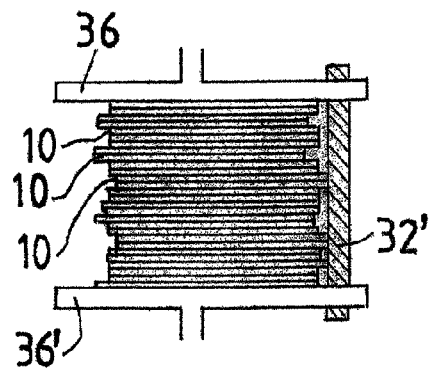
Figure 4B:
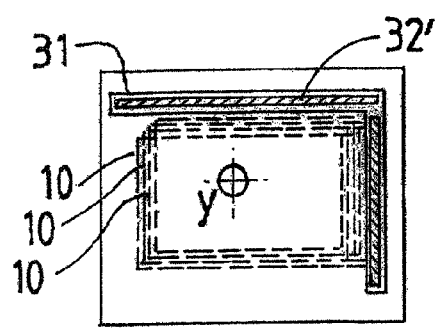
Figure 4C:
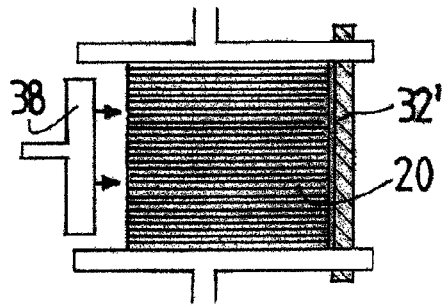
Figure 4C:
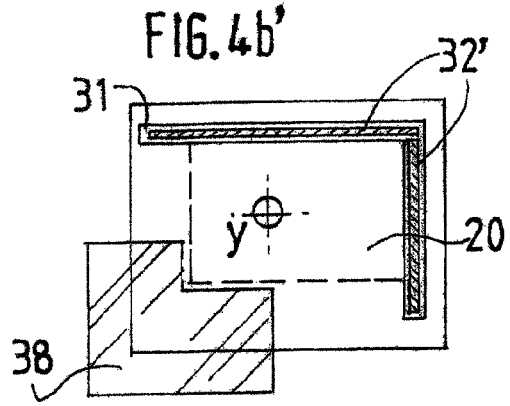
Figure 4D:
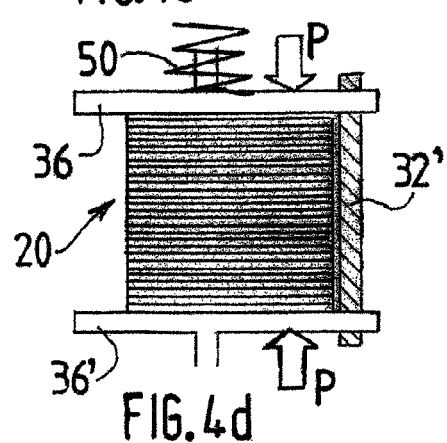
Figure 4D:
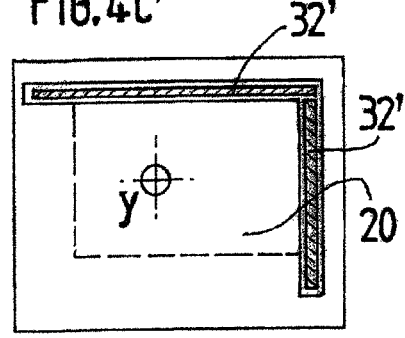

In a first step, depicted in FIGS. 4a and 4a', a certain number of cards 10 are made into a pile and these cards 10 are positioned between two plates 36 and 36'.

In a second step, depicted in FIGS. 4b and 4b', plates 32' intended to form an L-shaped element 32 are brought into position. These plates 32' are configured to slide in grooves 31 provided for that purpose in the plates 36 and 36'. The plates 32' thus positioned form end stops.

It may be conceivable for the second step to be performed before the first step.

In a third step, depicted in FIGS. 4c and 4c', the cards 10 are pushed toward the end stops by a tamping device 38. As can be seen from FIG. 4c' which is a plan view, the cards 10 form a pile 20 the edges of which are perfectly aligned.

A fourth step, depicted in FIGS. 4d and 4d', consists in using a pressing device 50 to press the cards 10 which form the ends of the pile 20 in such a way that the pile 20 is held firmly.

Figure 4E:
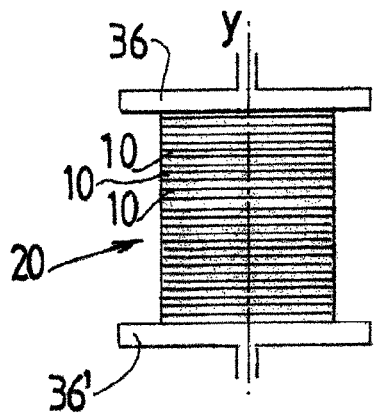
Figure 4E:
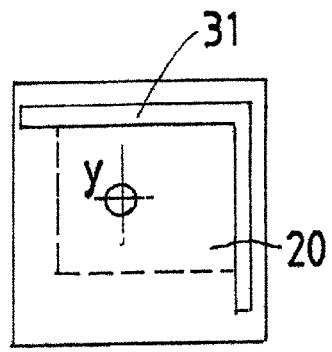

A fifth step, depicted in FIGS. 4e and 4e', consists in removing the plates 32' that form the end stops so that all of the edges of the pile 20 which are formed by the peripheral surfaces of the items 10, are accessible.

Figure 4F:
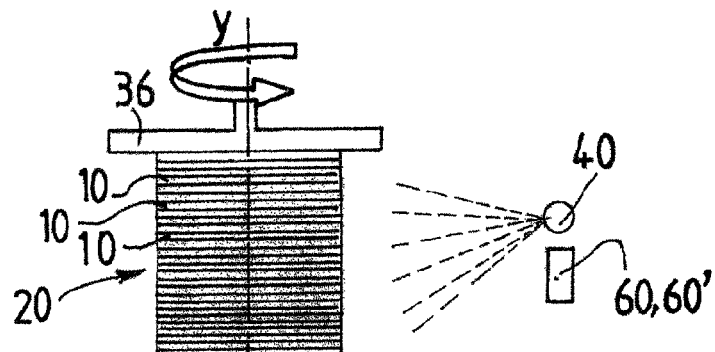
Figure 4G:
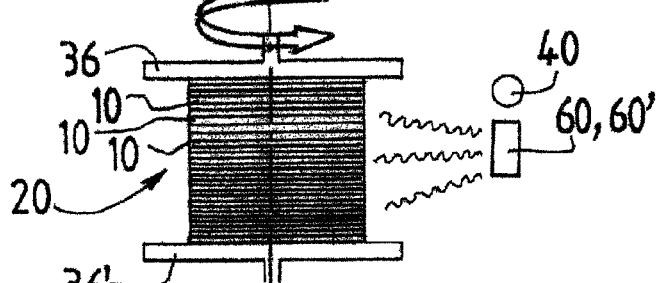

A sixth step, depicted in FIG. 4f, consists in rotating the pile 20 about its axis Y and using an application device 40 to spray paint onto the edges of the pile.

a seventh step, depicted in FIG. 4g, consists in using the drying device 60 to dry the paint applied to the pile 20 of cards 10.

According to one preferred embodiment, the drying step is performed back to back with the print heads to prevent ink from migrating between the cards. The dryer may be a thermal dryer or one operating using UV (ultraviolet) radiation.

Figure 4H:
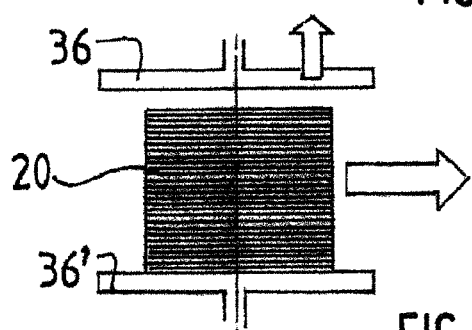

An eighth step, depicted in FIG. 4h, may consist in removing the plates 36 and 36' in order to recover the cards 10.

A plurality of cards 10 is thus obtained, the edge faces of which cards may be colored.

The personalizing device and/or the various steps of the method can quite obviously be adapted to suit the number of cards that are to be personalized and the type of personalization.

Thus, and as has been described earlier, it is possible to adapt other spraying and/or drying steps, notably where there is a desire to apply various products to the edges of the items.

It is also possible to add pre-drying and/or vibration steps if use is being made of a product that carries a risk of fusing the items together.

If the method is to be applied to a set of circular items such as CD-ROMs, then quite obviously the shapes of the end stops and of the tamping device will be adapted to suit.

According to another embodiment, the application device comprises a cylindrical heated print head which comes into contact with the surface that is to be covered. A ribbon is inserted between the print head and the surface that is to be covered. The ribbon comprises a backing element and an element that is to be applied. This ribbon is driven while the head hugs the surface that is to be covered, so as to transfer the element that is to be applied onto the surface that is to be covered.

The invention claimed is:

1. A method of personalizing at least two cards (10), each card (10) comprising a first face (12) and a second face (14) and a peripheral surface (16), the method comprising the following steps:
   forming a pile (20) of at least two cards (10) by superposing a first face (12) or a second face (14) of a card "n" in such a way that a first face or a second face of a card "n+1" is in contact with the first face (12) or the second face (14) of the card "n";
   aligning at least part of the peripheral surface (16) of the card "n" with at least part of the peripheral surface of the card "n+1" using an alignment device (32, 34; 32, 38; 31, 32', 38) so that at least part of the set of peripheral surfaces of each card forms at least one uniform surface;
   applying pressure to the pile to press the at least two cards together;
   while maintaining the pressure on the pile, applying at least one product to at least part of the uniform surface using an application device (40);
   after applying the at least one product to the uniform surface, releasing the pressure from the pile while maintaining the at least two cards in the pile; and
   after releasing the pressure from the pile, vibrating the pile with a separating device to encourage the at least two cards to separate.

2. The method as claimed in claim 1, further comprising positioning a mask opposite at least part of the uniform surface in such a way that the product is applied only to part of the uniform surface that is not covered by the mask.

3. The method as claimed in claim 1, wherein the step of vibrating the pile comprises pressing ends of the pile (20) towards one another using a pressing device (50) by applying pressure P to at least part of the visible faces of the cards which form the ends of the pile (20).

4. The method as claimed in claim 1, further comprising removing the alignment device (32, 34; 32, 38; 31, 32', 38) and applying the product to the part of the peripheral surface used for aligning the pile (20).

5. The method as claimed in claim 1, further comprising reducing irregularities of the peripheral surface.

6. The method as claimed in claim 1, further comprising pre-drying, using a pre-drying device (60'), the product applied to the uniform surface in such a way that the product does not run between the faces (12, 14) of the cards; and thereafter performing the vibrating step so that the product does not stick the cards together.

7. The method as claimed in claim 1, further comprising drying, using a drying device (60), the product applied to the uniform surface.

8. The method as claimed in claim 1, wherein the application device (40) is a spraying device.

9. The method as claimed in claim 1, wherein the spraying device is an inkjet.

10. The method as claimed in claim 1, wherein the application device is a transfer device.

11. The method as claimed in claim 10, wherein the transfer device is a thermal transfer device.

12. The method as claimed in claim 10, wherein the transfer device comprises a head made of a malleable material.

13. The method as claimed in claim 12, wherein the malleable material that forms the head is a material that, at least in part, contains silicone.

14. The method as claimed in claim 1, wherein the product is a UV-curable ink.

15. The method as claimed in claim 1, wherein the product is a resin-based ink.

16. The method as claimed in claim 1, wherein the at least two cards are chip cards.

17. The method as claimed in claim 1, wherein the at least two cards are one of identification, identity, transport, bank, and loyalty cards.

18. The method as claimed in claim 1, wherein the at least two cards are CD-ROMs or DVD-ROMs.

19. The method as claimed in claim 1, wherein the at least two cards are CD-ROMs or DVD-ROMs.

20. The method as claimed in claim 1, wherein the at least two cards are made of a plastic material.

21. The method as claimed in claim 1, wherein the step of applying the at least one product comprises applying at least one said product in bands perpendicular to the first and second faces.

22. The method as claimed in claim 1, wherein the at least one product is an adhesive product containing flakes or particles.

23. A device (80) for personalizing at least two cards (10), each card (10) comprising a first face, a second face and a peripheral surface, the device comprising:
   an alignment device that forms a pile (20) of at least two cards (10) in which a first face (12) or a second face (14) of a card "n" is in contact with a first face (12) or a second face (14) of a card "n+1", the alignment device being arranged to align at least part of the peripheral surface (16) of the card "n" with at least part of the peripheral surface of the card "n+1" so that at least part of the set of peripheral surfaces of each of the at least two cards forms at least one uniform surface;
   a pressing device that applies pressure to the pile to press the at least two cards together;
   an application device that applies at least one product to at least part of the uniform surface while the at least two cards are maintained in the pile;
   the pressing device being adapted to release, after application of the product, the pressure from the pile while maintaining the at least two cards in the pile; and
   a separating device that, after the pressure has been released, vibrates the pile to encourage the at least two cards to separate.

* * * * *